UNITED STATES PATENT OFFICE 2,480,200

BIOTIN INTERMEDIATE

Otto Schnider, Jean-Pierre Bourquin, and André Grüssner, Basel, Switzerland, assignors to Hoffmann-La Roche, Inc., Nutley, N. J., a corporation of New Jersey No Drawing. Original application January 29, 1946, Serial No. 644,186. Divided and this application April 29, 1947, Serial No. 744,774

6 Claims. (Cl. 260—329)

This invention relates to the manufacture of intermediates useful in the preparation of compounds having a biotin activity. This application is a division of application Serial No. 644,186, filed January 29, 1946, now Patent 2,454,217, which application is in turn a continuation-in-part of application Serial No. 585,570, filed March 29, 1945, now Patent 2,417,326.

According to application 585,570, thiophan-one-(3)-carboxylic acid esters can be used as starting materials for the manufacture of derivatives carrying in position 2 an alkyl radical or an omega-substituted alkyl radical. Compounds carrying, apart from alkyl radicals, for instance the following radicals, may be employed: omega-hydroxyalkyl-, omega-alkoxyalkyl-, omega-aryl-oxyalkyl- or omega-halogenalkyl-radicals. The thiophan-one - (3) - carboxylic acid esters (I), which carry a suitable substituent in position 2, are initially converted into the corresponding cyanohydrins (II) by means of hydrocyanic acid. The same are saponified without further purification and the resulting dicarboxylic acids (III) esterified. The 3-hydroxythiophan - 3,4 - dicarboxylic acid esters (IV), substituted in position 2, are oils capable of being distilled. Upon reacting with halides of phosphorus and sulphur, e. g. thionyl chloride, they are transformed into the 3-chlorine esters (V). By means of reducing agents the halogen can be eliminated, whereby the thiophan-3,4-dicarboxylic acid esters (VI), substituted in position 2, are obtained. This synthesis may be illustrated by the following reaction scheme, which appears in our copending application 644,186:

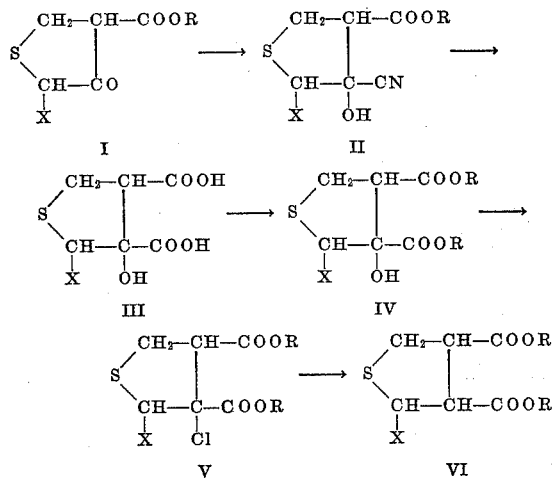

In these formulae, R stands for lower alkyl, and X is an alkyl radical, or an omega-substituted radical, and more particularly, an aliphatic omega-substituted alkyl radical.

A specific method for preparing the dicarboxylic acid ester, according to our application 585,570, is given as follows:

80 parts by weight of finely powdered potassium cyanide are added to a solution of 188 parts by weight of 2-methyl-3-oxo-thiophan - 4 - carboxylic-acid-ethyl-ester in 500 parts by volume of ether. While stirring and cooling well, 90 parts by volume of concentrated hydrochloric acid are added dropwise in the course of about 2 hours. After evaporation of the ether, 300 parts by volume of ethyl alcohol and 300 parts by volume of concentrated hydrochloric acid are added to the remaining 2-methyl-3-hydroxy - 3 - cyano-thiophan-4-carboxylic-acid-ethyl-ester; saponification is effected by first slowly distilling off the alcohol and then allowing the product to stand in a boiling water bath for another 2 hours. By concentration in vacuo, 2-methyl-3-hydroxy-thiophan-3,4-dicarboxylic acid is obtained, which can be converted into the 2-methyl-3-hydroxy-thiophan-3,4 - dicarboxylic - acid - diethyl - ester without further purification by means of ethyl alcohol and hydrochloric acid. It boils at a pressure of 0.05 mm. at 101 to 102° C. as an almost colourless, viscous oil.

262 parts by weight of 2-methyl-3-hydroxy-thiophan-3,4-dicarboxylic-acid-diethyl-ester are dissolved in 500 parts by volume of chloroform and successively treated with 80 parts by volume of pyridine and 119 parts by volume of thionyl chloride while cooling well with ice. The product is first allowed to stand for 2 hours and then heated for about 40 minutes in a boiling water bath until the evolution of gas has ceased. Thereupon, the product is poured on ice, divided in a separating funnel and washed with water and dilute sodium carbonate solution until neutral reaction sets in. The 2-methyl-3-chloro-thiophan-3,4-dicarboxylic-acid-diethyl-ester separated from the chloroform boils at a pressure of 0.1 mm. at 100 to 102° C.

186 parts by weight of sodium-iodide hydrate are added to a solution of 280 parts by weight of 2-methyl-3-chloro-thiophan - 3,4 - dicarboxylic-acid-diethyl-ester in 4000 parts by volume of 80 per cent. acetic acid, and 1400 parts by weight of zinc dust introduced in small portions in the course of about 4 hours while stirring. Each time slight warming sets in. After further stirring for about 12 hours, the zinc acetate is separated, the acetic acid removed by distillation and the residue distilled in vacuo after thoroughly washing with water and sodium carbonate solution. The 2-methyl-thiophan-3,4-dicarboxylic-acid-diethyl-ester boils at a pressure of 0.02 mm. at 88 to 90° C. as a colourless oil.

The preparation of 2-(omega-methoxy-butyl)-thiophan-3,4-dicarboxylic-acid - diethyl-ester is described in our copending application 644,186. In this synthesis, 80 parts by weight of finely pulverized potassium cyanide are added to a solution of 260 parts by weight of 2-(omega-methoxybutyl)-3-oxo-thiophan - 4 - carboxylic - acid-ethyl-ester in 540 parts by volume of dibutyl ether and then 106 parts by volume of concentrated hydrochloric acid allowed to drop in during 8 hours while stirring and cooling with ice. The reaction mixture is left to stand overnight at 0° C. The crystallised cyanohydrin with the potassium chloride is separated from the dibutyl-ether solution by suction. The separation of the cyanohydrin from the potassium chloride is effected by dissolving the former in chloroform. The chloroform solution is dried with sodium sulphate and after filtration brought to dryness in vacuo at a bath temperature of 30° C. The 2-(omega - methoxybutyl)-3-hydroxy - 3 - cyano-thiophan-4-carboxylic-acid-ethyl-ester, obtained in almost theoretical yield, has a melting point at 88° C. The methyl ester melts at 81.5 to 83.5° C.

287 parts by weight of 2-(omega-methoxybutyl)-3-hydroxy-3-cyano - thiophan-4-carboxylic-acid-ethyl-ester are reacted with a mixture of 600 parts by volume of concentrated hydrochloric acid, 300 parts by volume of water and 1100 parts by volume of ethyl alcohol and boiled under reflux for 48 hours. After evaporation in vacuo, the saponified product is converted into the 2-(omega-methoxybutyl)-3-hydroxy - thiophan - 3,4 - dicarboxylic - acid - diethyl-ester by means of ethyl alcohol and hydrogen-chloride gas. It boils at a pressure of 0.07 mm. at 145–147° C. as a light-yellow, viscous oil. The dimethyl ester boils at a pressure of 0.09 mm. at 146–149° C.

334 parts by weight of 2-(omega-methoxybutyl)-3-hydroxy-thiophan-3,4-dicarboxylic - acid-diethyl-ester are dissolved in 660 parts by volume of chloroform and reacted with 154 parts by weight of absolute pyridine and 231 parts by weight of thionyl chloride while cooling with ice. Reaction and working-up in accordance with the process as applied to the methyl-substituted compound described above yields a yellowish-brown, viscous oil, viz. 2-(omega-methoxybutyl)-3-chloro-thiophan-3,4-dicarboxylic-acid-diethyl - ester, melting point 138–143° C. at 0.03 mm. The dimethyl ester boils at 134 to 137° C. under a pressure of 0.03 mm.

353 parts by weight of 2-(omega-methoxybutyl)-3-chloro-thiophan-3,4 -dicarboxylic-acid-diethyl-ester are dissolved in 5100 parts by volume of 80 per cent. acetic acid, 230 parts by weight of potassium iodide are added, and, while stirring, 1550 parts by weight of zinc dust are introduced in small portions in the course of 4 hours at a temperature not exceeding 20–25° C. After working-up in accordance with the process as applied to the methyl-substituted compound described above, the 2-(omega-methoxybutyl)-thiopan-3,4-dicarboxylic-acid-diethyl-ester boils as a light-yellowish oil at 148 to 150° C. under a pressure of 0.03 mm. The 2-(omega-methoxybutyl)-thiopan-3,4 - dicarboxylic-acid-dimethyl-ester boils at 141 to 143° C. under a pressure of 0.03 mm.

It will be noted that compounds II to VI are characterized, not only by a substituent in the 2-position, but also by one or more substituents in the 3-position. In the 3-position, it will be noted that there is found one characteristic substituent which is carboxyl or a functional derivative thereof, e. g., cyano or carbalkoxy. It will also be noted that there may be substituted in position 3 hydroxy or chloro. In compound VI, it will be noted that there is only one substituent.

We claim:

1. A compound of the general formula:

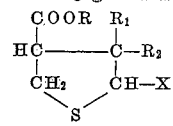

wherein X is a member selected from the group consisting of alkyl radicals and aliphatic omega-substituted-alkyl radicals, R is a member selected from the group consisting of hydrogen and lower alkyl, $R_1$ is a member selected from the group consisting of carboxyl, cyano, and carbalkoxy radicals and $R_2$ is a member selected from the group consisting of hydrogen, hydroxy, and chlorine.

2. A compound according to claim 1 in which R is lower alkyl, $R_1$ is cyano, and $R_2$ hydroxy.

3. A compound according to claim 1 in which R is lower alkyl, $R_1$ is lower carbalkoxy and $R_2$ is hydrogen.

4. A compound according to claim 3 in which X is aliphatic omega-substituted-alkyl.

5. A process which comprises treating a compound of the formula:

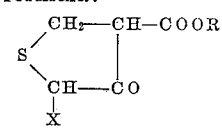

with hydrocyanic acid to produce the corresponding cyanohydrin of the formula:

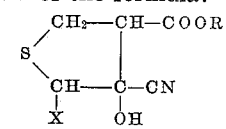

in which X is a member selected from the group consisting of alkyl radicals and aliphatic omega-substituted-alkyl radicals and R is lower alkyl.

6. A compound of the following formula

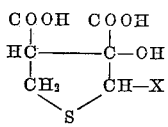

wherein X represents an aliphatic omega-substituted-alkyl radical.

OTTO SCHNIDER.
JEAN-PIERRE BOURQUIN.
ANDRÉ GRÜSSNER.

REFERENCES CITED

The following references are of record in the file of this patent:

UNITED STATES PATENTS

| Number | Name | Date |
|---|---|---|
| 2,382,418 | Hoffmann | Aug. 14, 1945 |
| 2,451,427 | Baker | Oct. 12, 1948 |

OTHER REFERENCES

Alles, J. Am. Pharm. & Exp. Ther. 72, 265 (1941).